United States Patent
Sera et al.

(10) Patent No.: US 11,656,807 B2
(45) Date of Patent: May 23, 2023

(54) PRINTING SYSTEM AND SERVER FOR RECEIVING VOICE PRINT INSTRUCTIONS INDICATING THE PRINTING OF A LIST

(71) Applicant: Seiko Epson Corporation, Tokyo (JP)

(72) Inventors: Takashi Sera, Shiojiri (JP); Shinichi Tsuruyama, Shiojiri (JP); Masaki Fukiage, Shiojiri (JP); Ryosuke Kakio, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/648,773

(22) Filed: Jan. 24, 2022

(65) Prior Publication Data

US 2022/0236928 A1 Jul. 28, 2022

(30) Foreign Application Priority Data

Jan. 26, 2021 (JP) .............................. JP2021-010079

(51) Int. Cl.
  G06F 15/00 (2006.01)
  G06F 3/12 (2006.01)
  G06K 1/00 (2006.01)
  G06F 3/16 (2006.01)

(52) U.S. Cl.
  CPC .......... G06F 3/1204 (2013.01); G06F 3/1257 (2013.01); G06F 3/1273 (2013.01); G06F 3/1285 (2013.01); G06F 3/167 (2013.01)

(58) Field of Classification Search
  CPC .... G06F 3/1204; G06F 3/1257; G06F 3/1273; G06F 3/1285; G06F 3/167
  USPC ............................... 358/1.15, 1.13, 1.14, 1.1
  See application file for complete search history.

(56) References Cited

U.S. PATENT DOCUMENTS

| 2014/0233060 | A1* | 8/2014 | Anezaki | ................ G06F 3/1258 358/1.15 |
| 2015/0092233 | A1* | 4/2015 | Park | ................... H04N 1/00244 358/1.15 |
| 2019/0384570 | A1* | 12/2019 | Tomioka | ............ H04N 1/00244 |

FOREIGN PATENT DOCUMENTS

JP  2019-219740  12/2019

* cited by examiner

Primary Examiner — Douglas Q Tran
(74) Attorney, Agent, or Firm — Workman Nydegger

(57) ABSTRACT

A printing system includes: a printing device; and a server connected to the printing device via a network. The server includes a print instruction acquisition unit that acquires a print instruction by voice from a voice mediation device and a transmitter that transmits to the printing device print data for printing content based on the print instruction among printable content. The printing device receives the print data, and performs printing in accordance with the print data. The print instruction includes a list print instruction for printing a list of at least part of the printable content. When the list print instruction is acquired, the transmitter transmits list data for printing the list to the printing device. The printing device receives the list data, and prints the list in accordance with the list data.

7 Claims, 12 Drawing Sheets

FIG. 10

| | VERSION INFORMATION 610 | | | | LIST L1 | ME1 |

DESIGN PAPER Ver. 3.06

| CID | 601 | 602 | CID | 601 | 602 |
|---|---|---|---|---|---|
| 1 | | BORDER 1 | 11 | | CHECK 1 |
| 2 | | BORDER 2 | 12 | | CHECK 2 |
| 3 | | BORDER 3 | 13 | | CHECK 3 |
| 8 | | POLKA DOT 3 | 18 | | ZIG-ZAG |
| 9 | | POLKA DOT 4 | 19 | | CIRCLE 1 |
| 10 | | POLKA DOT 5 | 20 | | CIRCLE 2 |

PRINTING SYSTEM AND SERVER FOR RECEIVING VOICE PRINT INSTRUCTIONS INDICATING THE PRINTING OF A LIST

The present application is based on, and claims priority from JP Application Serial Number 2021-010079, filed Jan. 26, 2021, the disclosure of which is hereby incorporated by reference herein in its entirety.

BACKGROUND

1. Technical Field

The present disclosure relates to a printing system and a server, the printing system including a printing device and the server.

2. Related Art

In recent years, printing has been performed by a printer via a server computer which provides a cloud printing service. Also, in recent years, smart speakers in coordination with a voice recognition service on the cloud have been sold on the market.

JP-A-2019-219740 discloses a printing system including a voice control device, a voice control device management server, a relay server, a multifunctional device, a terminal device, and an access point. The relay server generates message data for messages to be audibly output by a speaker of the voice control device. Printable content is notified to a user by voice from the voice control device, for example, like "A puzzle, coloring, . . . , a check list can be printed by a printer. Which item would you like to print?".

However, when printable content increases, it is difficult for a user to retrieve the types and names of printable content. Even when the voice control device includes a display unit, it is difficult for a user to retrieve the types and names of many pieces of printable content with a display unit having a limited area.

SUMMARY

A printing system of the present disclosure includes a printing device, and a server connected to the printing device via a network. The server includes: a print instruction acquisition unit that acquires a print instruction by voice from a voice mediation device; and a transmitter that transmits to the printing device print data for printing content based on the print instruction among printable content. The printing device receives the print data, and performs printing in accordance with the print data, the print instruction includes a list print instruction for printing a list of at least part of the printable content, when the list print instruction is acquired, the transmitter transmits list data for printing the list to the printing device, and the printing device receives the list data, and prints the list in accordance with the list data.

In addition, a server of the present disclosure is connected via a network to a printing device which performs printing in accordance with received data. The server includes: a print instruction acquisition unit that acquires a print instruction by voice from a voice mediation device; and a transmitter that transmits print data to the printing device, the print data for printing content based on the print instruction among printable content. The print instruction includes a list print instruction for printing a list of at least part of the printable content, and when the list print instruction is acquired, the transmitter transmits list data for printing the list to the printing device.

BRIEF DESCRIPTION OF THE DRAWINGS

FIG. 10 is a chart schematically illustrating an example of list print items in which version information is added to a list including content identification information.

DESCRIPTION OF EXEMPLARY EMBODIMENTS

Hereinafter, embodiments of the present disclosure will be described. Obviously, the following embodiments are merely examples of the present disclosure, and all the features shown in the embodiments are not necessarily required for the solution in the present disclosure.

1. Summary of Techniques Included in Present Disclosure

First, a summary of the techniques included in the present disclosure will be described with reference to the examples illustrated in FIGS. 1 to 12. Note that the drawings of the present application schematically illustrate examples, and the enlargement factors in the directions shown in these drawings may be different, thus the drawings may be inconsistent. Obviously, each component of the present technique is not limited to the specific example shown by a symbol. In the "summary of the techniques included in the present disclosure", each term with subsequent parentheses has a supplementary explanation therein.

Aspect 1

Figure 1:
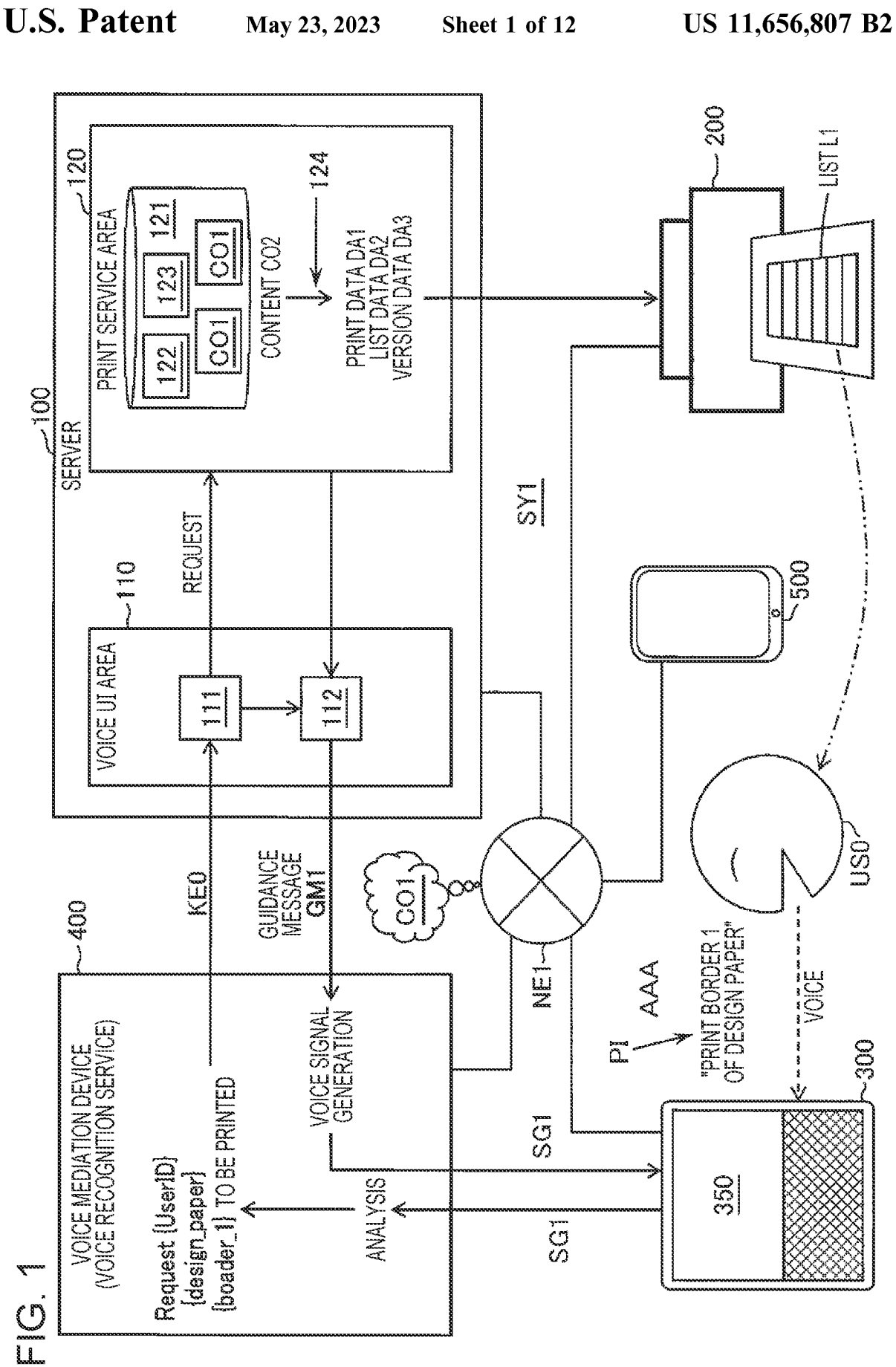
FIG. 1 is a block diagram schematically illustrating a configuration example of a system including a printing system.
Figure 2:
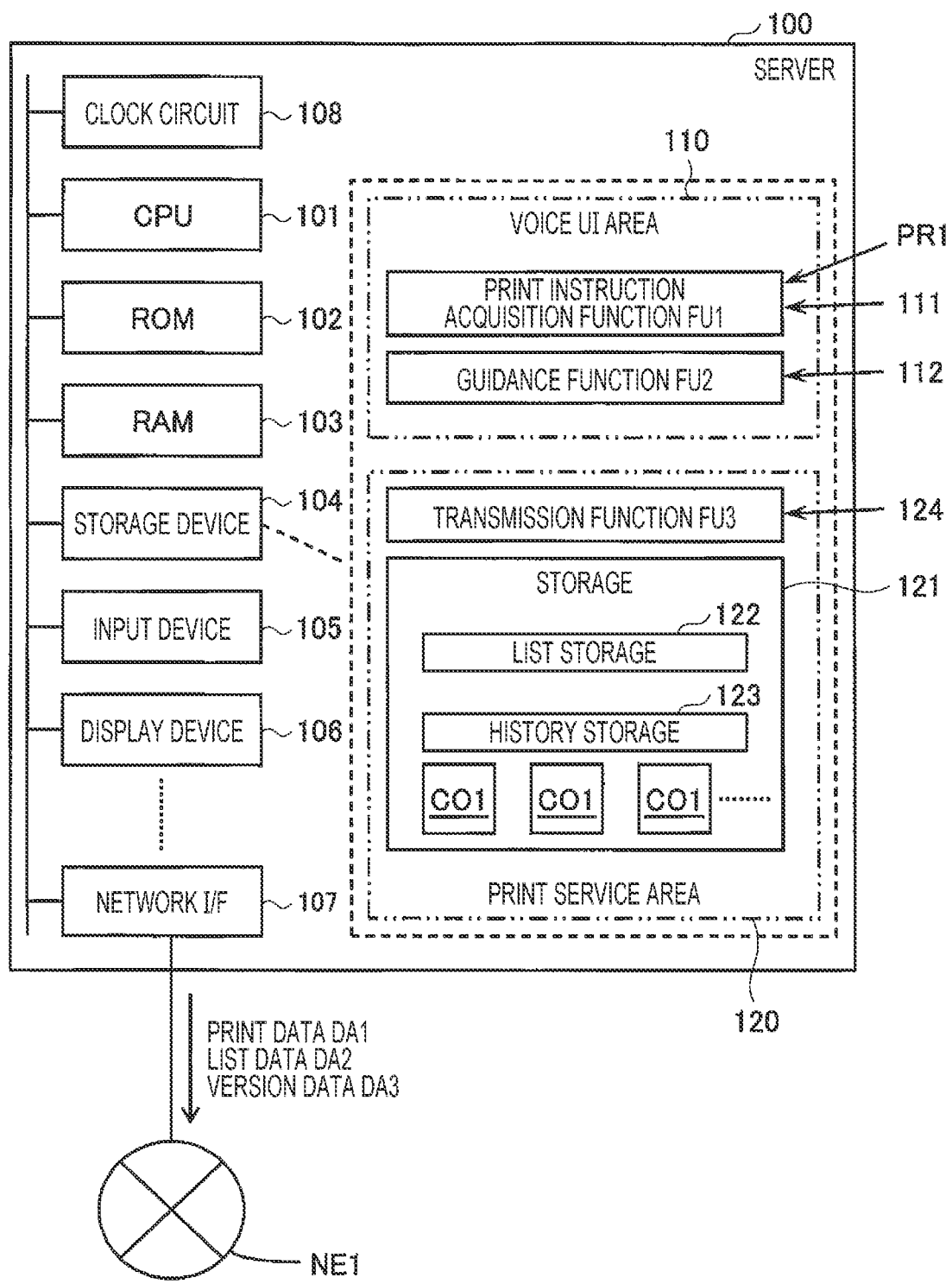
FIG. 2 is a block diagram schematically illustrating a configuration example of a server.
Figure 6:
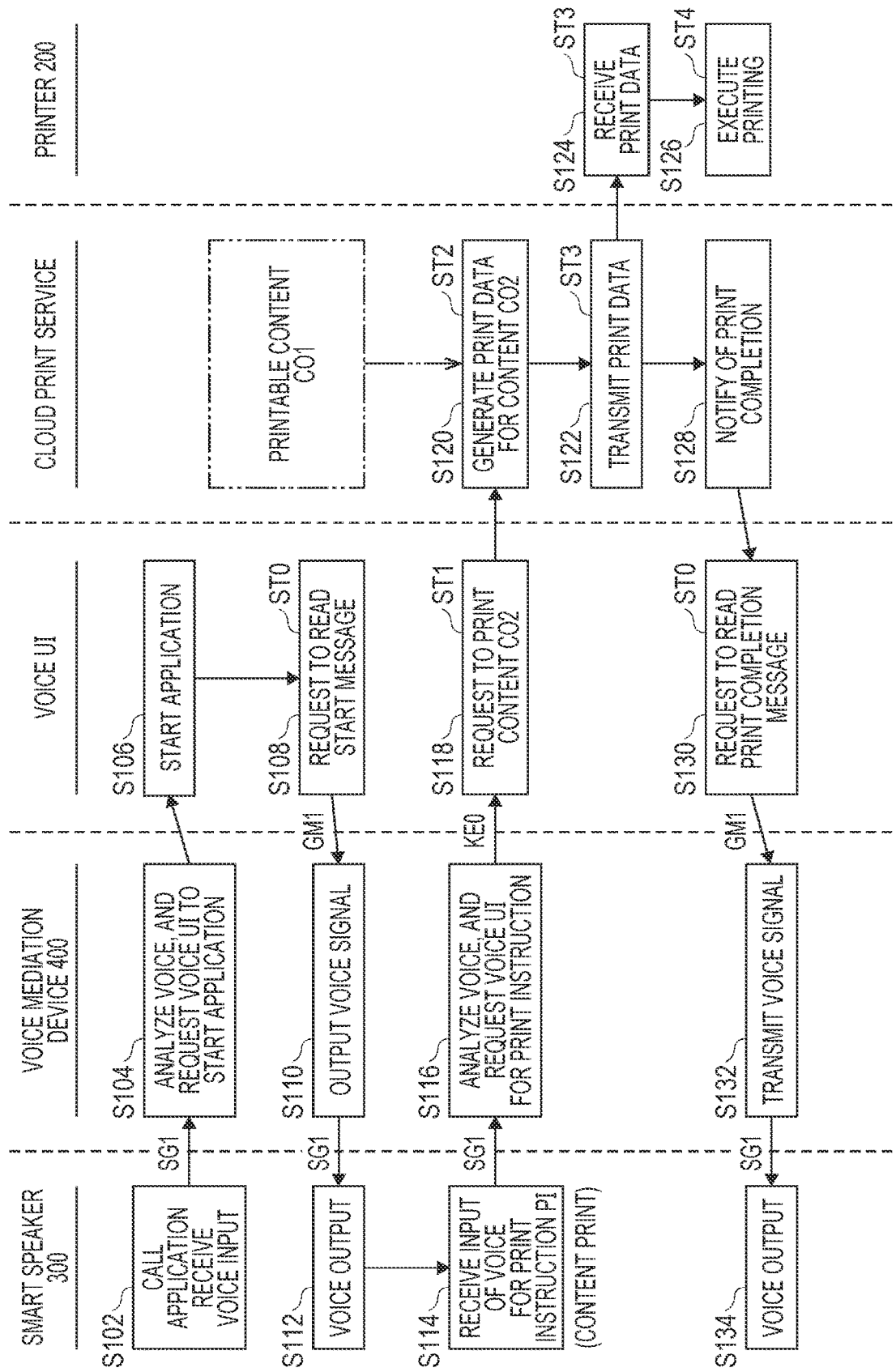
FIG. 6 is a chart schematically illustrating an example of a process of printing content by voice input.
Figure 7:
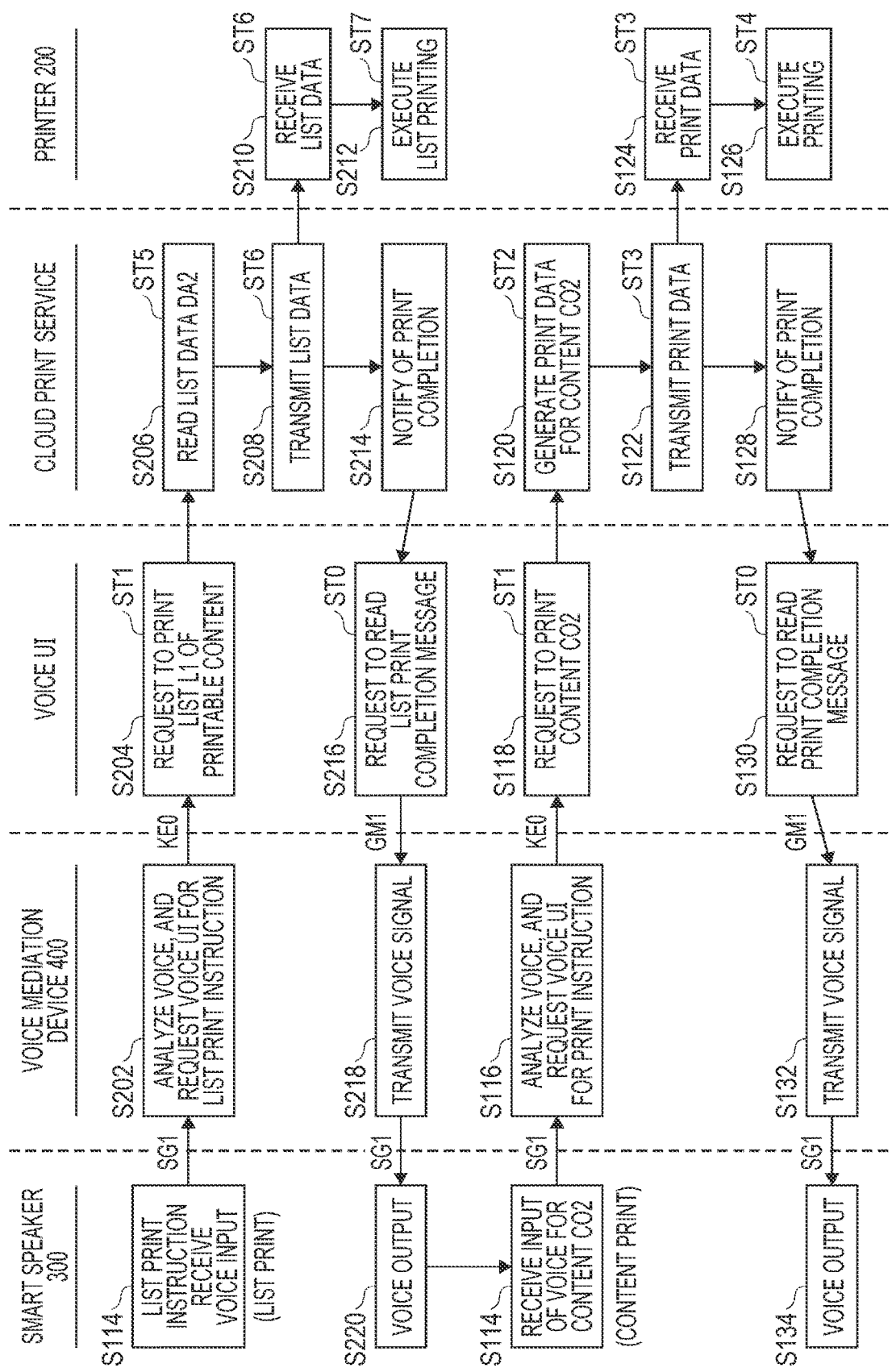
FIG. 7 is a chart schematically illustrating an example of a process of printing a list then printing content by voice input.

As illustrated in FIGS. 1 and 2, a printing system SY1 according to an aspect of the present technique includes a printing device (for example, a printer 200), and a server 100 connected to the printing device (200) via a network NE1. The server 100 includes a print instruction acquisition unit 111, and a transmitter 124. As illustrated in FIGS. 6 and 7, the print instruction acquisition unit 111 acquires a print instruction PI by voice from a voice mediation device 400. The transmitter 124 transmits print data DA1 to the printing device (200), the print data DA1 for printing content CO2 based on the print instruction PI among printable content CO1. The printing device (200) receives the print data DA1, and performs printing in accordance with the print data DA1. The print instruction PI includes a list print instruction LPI for printing list L1 (see FIG. 8, FIG. 10, and FIG. 12) of at least part of the printable content CO1. When the list print instruction LPI is acquired, the transmitter 124 transmits list data DA2 for printing the list L1 to the printing device (200). The printing device (200) receives the list data DA2, and prints the list L1 in accordance with the list data DA2.

In the aspect 1 described above, printing is performed in accordance with the print data DA1 for printing the content CO2 based on the print instruction PI by voice among the printable content CO1. When the print instruction PI is a list print instruction LPI for printing the list L1 of at least part of the printable content CO1, the list L1 is printed in accordance with the list data DA2 for printing the list L1. A user US0 can easily retrieve the printable content CO1 by viewing the print items in the list L1. Thus, the above-described aspect 1 can provide the printing system SY1 that facilitates the retrieval of the printable content CO1 by voice instruction.

Here, the server 100 refers to a computer that provides data, and may be a single computer or multiple computers connected to each other. The list L1 may be the list of all printable content, or a list of part of all printable content. The above-described additional remark is applied to the following aspects.

Aspect 2

Figure 3:
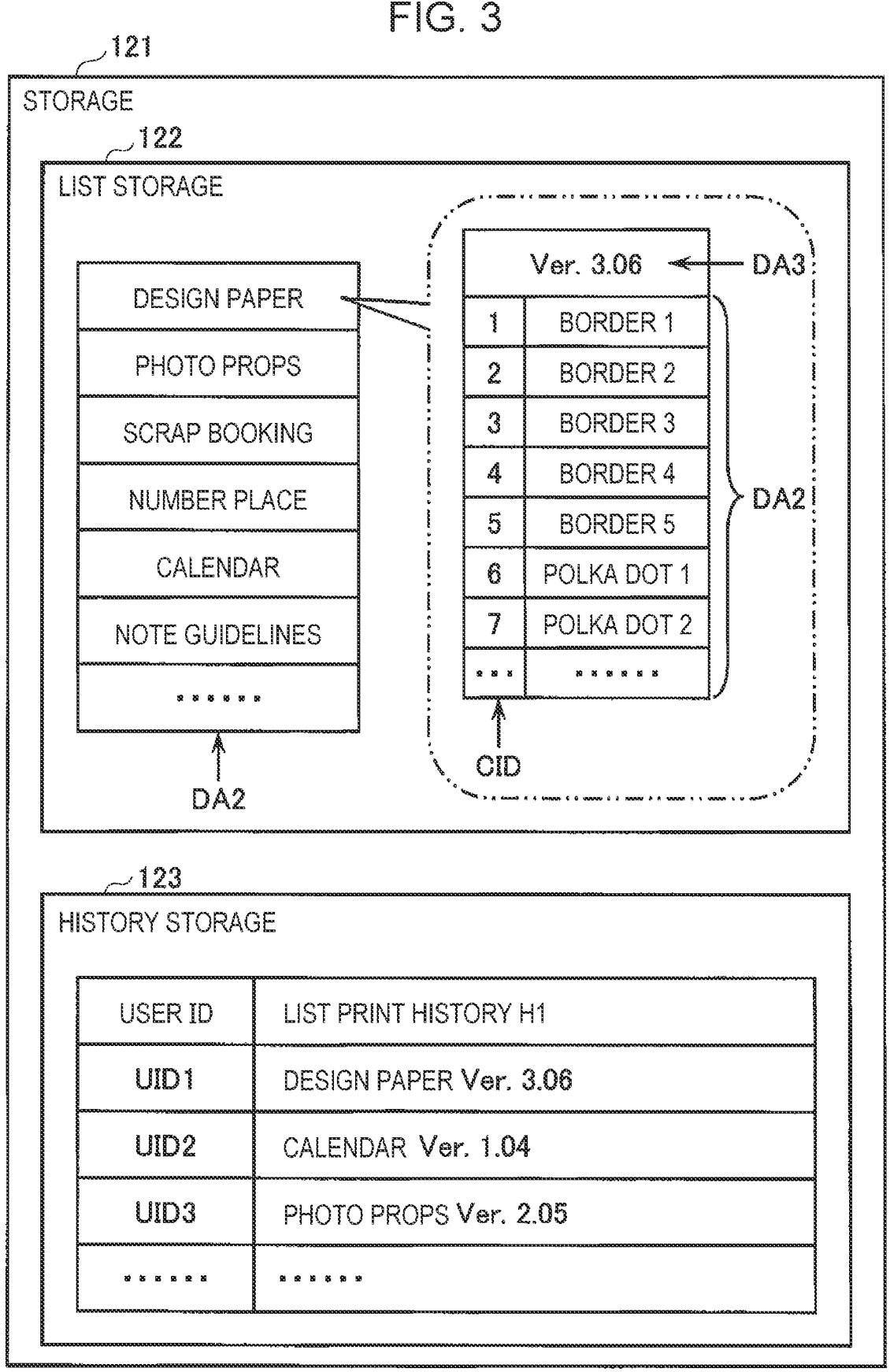
FIG. 3 is a diagram schematically illustrating a configuration example of a storage.

As illustrated in FIGS. 1 to 3, the server 100 may further include a list storage 122 that stores the list data DA2. As illustrated in FIG. 7, when the list print instruction LPI is acquired, the transmitter 124 may read the list data DA2 from the list storage 122, and may transmit the list data DA2 to the printing device (200). In this aspect, the printable content CO1 can be easily retrieved by voice instruction with a simple configuration. Although not mentioned in the aspect 2, when the list print instruction LPI is acquired, the transmitter 124 may generate the list data based on the printable content CO1, and may transmit the list data to the printing device.

Aspect 3

The print instruction PI may include an instruction to print content CO2 contained in the printable content CO1 in the list L1. The transmitter 124 may transmit to the printing device (200) the print data DA1 for printing the content CO2 based on the print instruction PI among the printable content CO1 in the list L1. This aspect can provide a desirable example which facilitates the retrieval of the printable content CO1 by voice instruction.

Aspect 4

Figure 11:
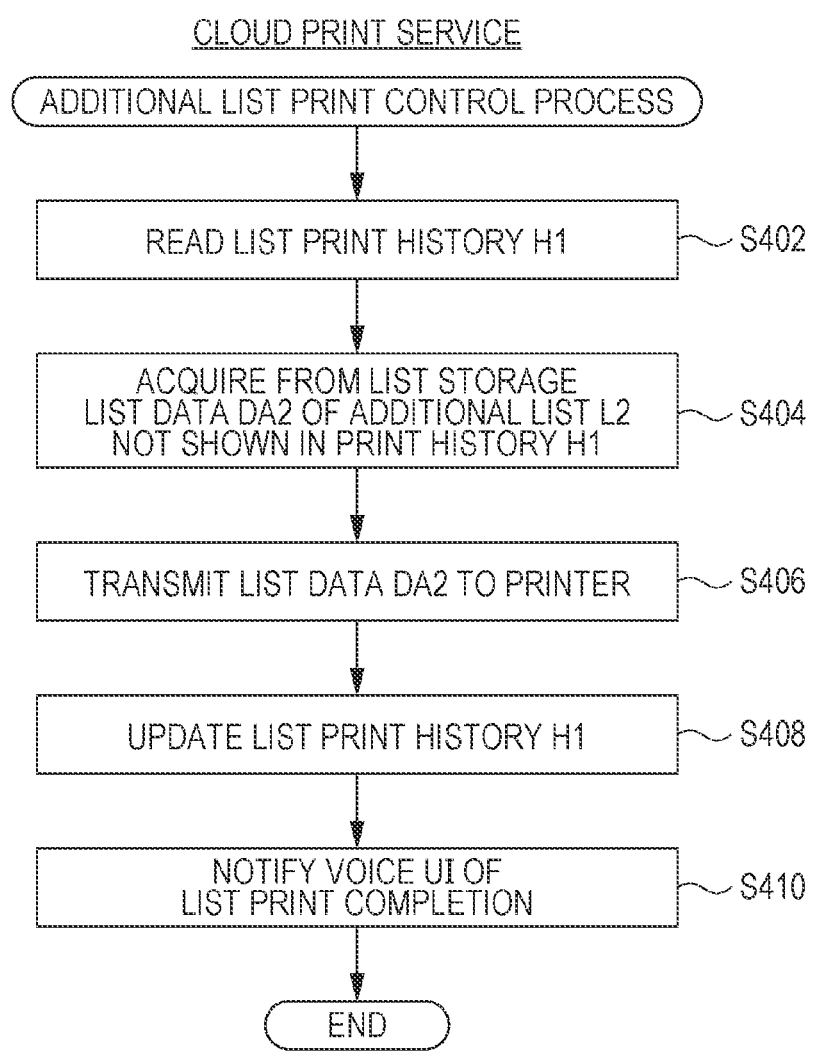
FIG. 11 is a flowchart schematically illustrating an example of an additional list print control process.

As illustrated in FIGS. 1 to 3, the server 100 may further include a history storage 123 that stores the history (for example, a print history H1) of the list L1 printed by the printing device (200). As illustrated in FIG. 11, the transmitter 124 may transmit to the printing device (200) the list data DA2 for printing an additional list L2 (see FIG. 12) of content, as the list L1, not shown in the history (H1) stored in the history storage 123 among the printable content CO1. The printing device (200) receives the list data DA2, and may print the additional list L2 in accordance with the list data DA2. This aspect facilitates the retrieval of added printable content CO1.

Aspect 5

As illustrated in FIGS. 1, 2, 4, 9, when the list print instruction LPI is acquired, the transmitter 124 may transmit to the printing device (200) the list data DA2 for printing the list L1 and version data DA3 for printing version information 610 representing the version of the list L1. The printing device (200) receives the list data DA2 and the version data DA3, and may print the list L1 and the version information 610 in accordance with the list data DA2 and the version data DA3 (see FIG. 10). This aspect facilitates the retrieval of the version of the printed list.

Aspect 6

Figure 9:
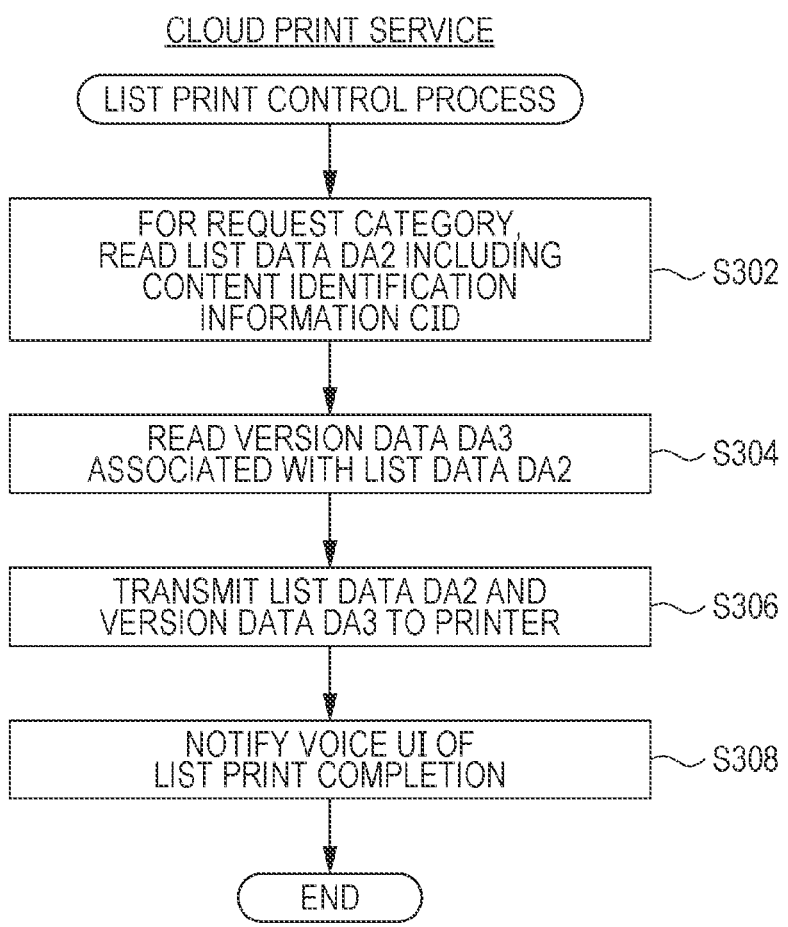
FIG. 9 is a flowchart schematically illustrating an example of a list print control process.

As illustrated in FIG. 9, when the list print instruction LPI is acquired, the transmitter 124 may transmit to the printing device (200) identification information (for example, content identification information CID) to identify the content included in the list L1, and the list data DA2 for printing the list L1. The printing device (200) receives the list data DA2, and may print the list L1 including the identification information (CID) in accordance with the list data DA2 (see FIG. 10). The print instruction acquisition unit 111 may acquire the identification information (CID) by voice from the voice mediation device 400. The transmitter 124 may transmit to the printing device (200) print data for printing the content CO2 identified by the identification information (CID) as the print data DA1. This aspect can facilitate instructions for printing content in the list.

Aspect 7

The server 100 according to an aspect of the present technique is connected via the network NE1 to the printing device (200) which performs printing in accordance with received data, and includes the print instruction acquisition unit 111 and the transmitter 124. The print instruction acquisition unit 111 acquires print instruction PI by voice from the voice mediation device 400. The transmitter 124 transmits to the printing device (200) print data DA1 for printing the content CO2 based on the print instruction PI among the printable content CO1. The print instruction PI includes a list print instruction LPI for printing list L1 of at least part of the printable content CO1. When the list print instruction LPI is acquired, the transmitter 124 transmits to the printing device (200) list data DA2 for printing the list L1. Thus, this aspect can provide the server 10 that facilitates the retrieval of the printable content CO1 by voice instruction. Note that the above-described aspects 2 to 6 can be added to the above-described aspect 7.

In addition, the present technique is applicable to a compound system including the above-described printing system SY1, a compound device including the above-described server 100, a print method performed by the above-described printing system, a print control method performed by the above-described server 100, a print program that causes a computer to implement the functions corresponding to the units of the above-described printing system SY1, a print control program that causes a computer to implement the functions corresponding to the units of the above-described server 100, and a computer-readable medium on which the above-described program is recorded.

2. Specific Example of Configuration of System Including Printing System Sy1

FIG. 1 schematically illustrates a specific example of the configuration of a system including the printing system SY1. The system illustrated in FIG. 1 includes the server 100, the printer 200, a smart speaker 300, the voice mediation device 400, and the terminal 500. The printing system SY1 includes the server 100 and the printer 200. The user US0 can directly operate the printer 200, the smart speaker 300, and the terminal 500. The server 100, the printer 200, the smart speaker 300, the voice mediation device 400, and the terminal 500 are connected to the network NE1 including the Internet. The network NE1 including the Internet may include the LAN. Here, the LAN is an abbreviation of Local Area Network. The connection to the network NE1 may be a wired connection, a wireless connection, or both wired and wireless connection. The server 100 is a server computer that provides a function called a cloud print service, and provides a function called voice UI to the voice mediation device 400. Here, UI is an abbreviation of user interface. At the time of printing the content CO2, the server 100 transmits the print data DA1 based on a keyword KE0 from the voice mediation device 400 to the printer 200. The printer 200 is a printing device that forms a print image in accordance with the print data DA1 from the server 100. The server 100 of the present specific example also transmits to the printer 200 the list data DA2 for printing the list L1 of at least part of the printable content CO1, and the version data DA3 for printing version information which represents the version of the list L1 according to a print instruction. The smart speaker 300 is a voice I/O device using the function called a voice recognition service by the voice mediation device 400. The voice mediation device 400 is a server computer that provides a voice recognition service utilizing AI. Here, AI is an abbreviation of artificial intelligence.

In the following description, the "voice UI area 110" and the "print service area 120" are assumed to be areas where programs and data are stored. The "voice UI" refers to a section of the server 100, which implements a function called voice UI, and is assumed to be an operation main body that performs a process by executing a program stored in the voice UI area 110. In addition, the "cloud print service" refers to a section of the server 100, which implements a function called a cloud print service, and is assumed to be an operation main body that performs a process by executing a program stored in the print service area 120. The keyword KE0 may be a term for collectively handling target records when identified, and is not limited to a word, and may be a phrase or a clause.

The server 100 has the voice UI area 110 which is a storage area for information to implement the voice UI, and the print service area 120 which is a storage area for information to implement the cloud print service. The voice UI is a service built on the platform of the voice recognition service by a provider of the cloud print service. The voice UI area 110 includes an information area to implement the print instruction acquisition unit 111 and a guidance unit 112. The print service area 120 includes an information area to implement a storage 121 and the transmitter 124. The storage 121 includes the list storage 122 to store the list data DA2, and the history storage 123 to store the history of the list L1 printed by the printer 200, and stores multiple pieces of printable content CO1. Note that the voice UI and the cloud print service may be built on separate computers. In addition, the voice UI may be built on a server computer that provides a voice recognition service.

For example, when the user US0 utters "AAA" which is the name of the printing system SY1, the smart speaker 300 converts the voice from the user US0 into a digital audio signal SG1, and transmits the digital audio signal SG1 to the voice mediation device 400 via the network NE1. After receiving the digital audio signal SG1, the voice mediation device 400 acquires identification information of the user US0, analyzes the voice based on the digital audio signal SG1, notifies the voice UI that the printing system SY1 has been called, and passes the identification information of the user US0 and the keyword KE0 called "AAA" to the voice UI. The voice mediation device 400 receives smart speaker identification information 300*id* illustrated in FIG. 5 from the smart speaker 300, and may acquire identification information of the user US0 associated with the smart speaker identification information 300*id*. The voice mediation device 400 may identify the user US0 based on the digital audio signal SG1, and may acquire the identification information of the identified user US0. After receiving the identification information and the keyword KE0 by the print instruction acquisition unit 111, the voice UI starts a voice print application, generates a guidance message GM1, such as "What would you like to print?", and transmits the guidance message GM1 to the voice mediation device 400. After receiving the guidance message GM1, the voice mediation device 400 converts the guidance message GM1 into a digital audio signal SG1, and transmits the converted digital audio signal SG1 to the smart speaker 300 via the network NE1. After receiving the digital audio signal SG1 converted from the guidance message GM1, the smart speaker 300 converts the digital audio signal SG1 into voice, and outputs the voice, such as "What would you like to print?".

After hearing the guidance message GM1, when the user US0 utters "Print border 1 of the design paper", for example, the smart speaker 300 converts the voice from the user US0 into a digital audio signal SG1 for requesting printing, and transmits the digital audio signal SG1 for requesting printing to the voice mediation device 400 via the network NE1. After receiving the digital audio signal SG1 for requesting printing, the voice mediation device 400 acquires identification information of the user US0, and analyzes the voice based on the digital audio signal SG1, and when the voice includes a print request keyword such as "Print . . . ", the voice mediation device 400 requests the voice UI for printing, and passes the identification information of the user US0 and the keyword KE0 such as "design paper" and "border 1" included in the voice to the voice UI. "{userID}" in "Request {userID} {design paper} {boader_1}" illustrated in FIG. 1 indicates identification information of the user US0, "{design paper}" indicates a keyword KE0 such as "design paper", and "{boader_1}" indicates a keyword KE0 such as "border 1". After receiving the print request keyword, the identification information and the keyword KE0, the voice UI sends a print instruction for the content CO2 identified by the keyword KE0 among the printable content CO1 to the cloud print service. The printable content CO1 includes the content stored in the storage 121, and the content stored in an external server computer which is not illustrated. After receiving the print instruction, the cloud print service generates print data DA1 using the content CO2, and transmits the print data DA1 to the printer 200 via the network NE1. After receiving the print data DA1, the printer 200 performs printing in accordance with the print data DA1. Thus, the content CO2 of "border 1" of "design paper" uttered by the user US0 is printed. Note that not only a print target, but also the printer 200, which is assumed to be an output destination by the user US0, may also be designated with the keyword KE0 by saying "Print the border 1 of the design paper using company A printer".

Obviously, the print request keyword is not limited to "Print . . . ", and may include similar variety of variations, such as "Perform printing of . . . ". Thus, for voice including these variations, the server 100 may perform a process similar to the process for voice including the print request keyword "Print . . . ".

The user US0 utters a list print instruction LPI for printing list L1 of at least part of the printable content CO1, thereby causing the printer 200 to print the list L1. Thus, the user US0 can easily retrieve the printable content CO1 by reviewing the printed list L1, and can cause the printer 200 to print a desired content CO2 from the printable content CO1.

FIG. 2 schematically illustrates the configuration of the server 100. The server 100 illustrated in FIG. 2 is a single server computer having the voice UI area 110 and the print service area 120; however, the server 100 may be comprised of multiple server computers connected to each other. For example, the server 100 may have a configuration in which a server computer having the voice UI area 110 and a server computer having the print service area 120 are separately provided. In addition, the voice UI area 110 may be built on a server computer which provides a voice recognition service, and even in this case, the server 100 including the voice UI area 110 and the print service area 120 is comprised.

The server 100 illustrated in FIG. 2 includes a CPU 101 serving as a processor, a ROM 102 serving as a semiconductor memory, a RAM 103 serving as a semiconductor memory, a storage device 104, an input device 105, a display device 106, a network I/F 107, and a clock circuit 108. These components 101 to 108 are electrically coupled, thereby making it possible to input and output information to and from each other. Here, CPU is an abbreviation of Central Processing Unit, ROM is an abbreviation of Read Only Memory, RAM is an abbreviation of Random Access Memory, and I/F is an abbreviation of interface.

The storage device 104 stores an OS which is not illustrated, and has the above-described voice UI area 110, and print service area 120. Here, the OS is an abbreviation of operating system. The voice UI area 110 stores a program which causes the server 100 to implement a print instruction acquisition function FU1 and a guidance function FU2. The print service area 120 has the storage 121 which includes the list storage 122 and the history storage 123, and stores the printable content CO1. The print service area 120 stores a program which causes the server 100 to implement a transmission function FU3. A print control program PR1 includes programs which cause the server 100 to implement the above-mentioned functions FU1 to FU3. The information stored in the storage device 104 is read into the RAM 103 as appropriate, and is used for a process for causing the printer 200 to perform printing. A magnetic storage device such as a hard disk, or a nonvolatile semiconductor memory such as a flash memory may be used as the storage device 104. Note that the print control program PR1 may be called a print application from the viewpoint of the user US0.

As the input device 105, a pointing device, a hard key including a keyboard, or a touch panel applied to the surface of a display panel may be used. A liquid crystal display panel or the like may be used as the display device 106. The network I/F 107 is connected to the network NE1, and communicates with the devices connected to the network NE1 in accordance with a predetermined communication standard. The clock circuit 108 can output the current date and time.

The CPU 101 performs a print instruction acquisition process corresponding to the print instruction acquisition function FU1, a guidance process corresponding to the guidance function FU2, and a print data transmission process corresponding to the transmission function FU3 by executing the print control program PR1 which is read from the storage device 104 into the RAM 103. The print control program PR1 causes the server 100 to function as the print instruction acquisition unit 111 corresponding to the print instruction acquisition function FU1, the guidance unit 112 corresponding to the guidance function FU2, and the transmitter 124 corresponding to the transmission function FU3, the server 100 being a computer. As illustrated in FIGS. 6 and 7, the server 100 executing the print control program PR1 performs a print instruction acquisition step ST1, a guidance step ST0, a print data generation step ST2, a print data transmission step ST3, a print step ST4, a list data acquisition step ST5, a list data transmission step ST6, and a list print step ST7. The computer-readable medium storing the print control program PR1 is not limited to the storage device 104, and may be a recording medium outside the server 100.

FIG. 3 schematically illustrates the configuration of the storage 121. The list storage 122 included in the storage 121 stores the list data DA2 for each of the categories, such as design paper, photo props, and scrap booking. FIG. 3 illustrates the structure of the list data DA2 for design paper as an example of category. The list data DA2 is data for printing the list L1 of at least part of the printable content CO1, and FIG. 3 illustrates the border 1, the border 2, the border 3 as the printable content CO1. The list data DA2 prepared in the list storage 122 is assumed to be data for causing the printer 200 to print the list L1 of all the latest printable content CO1. As illustrated in FIG. 3, each of the printable content CO1 is assigned content identification information CID to identify the content CO1. In addition, the list data DA2 may be assigned version data DA3 for printing version information 610 which indicates the version of the list L1.

The history storage 123 included in the storage 121 stores the print history H1 of the list L1 printed by the printer 200 with the identification information of each user US0 associated with a corresponding print history. The user ID illustrated in FIG. 3 indicates the identification information of the user US0. For example, user ID "UID1" is associated with "design paper" of "Ver. 3.06" as the print history H1 of the list L1.

Figure 4:
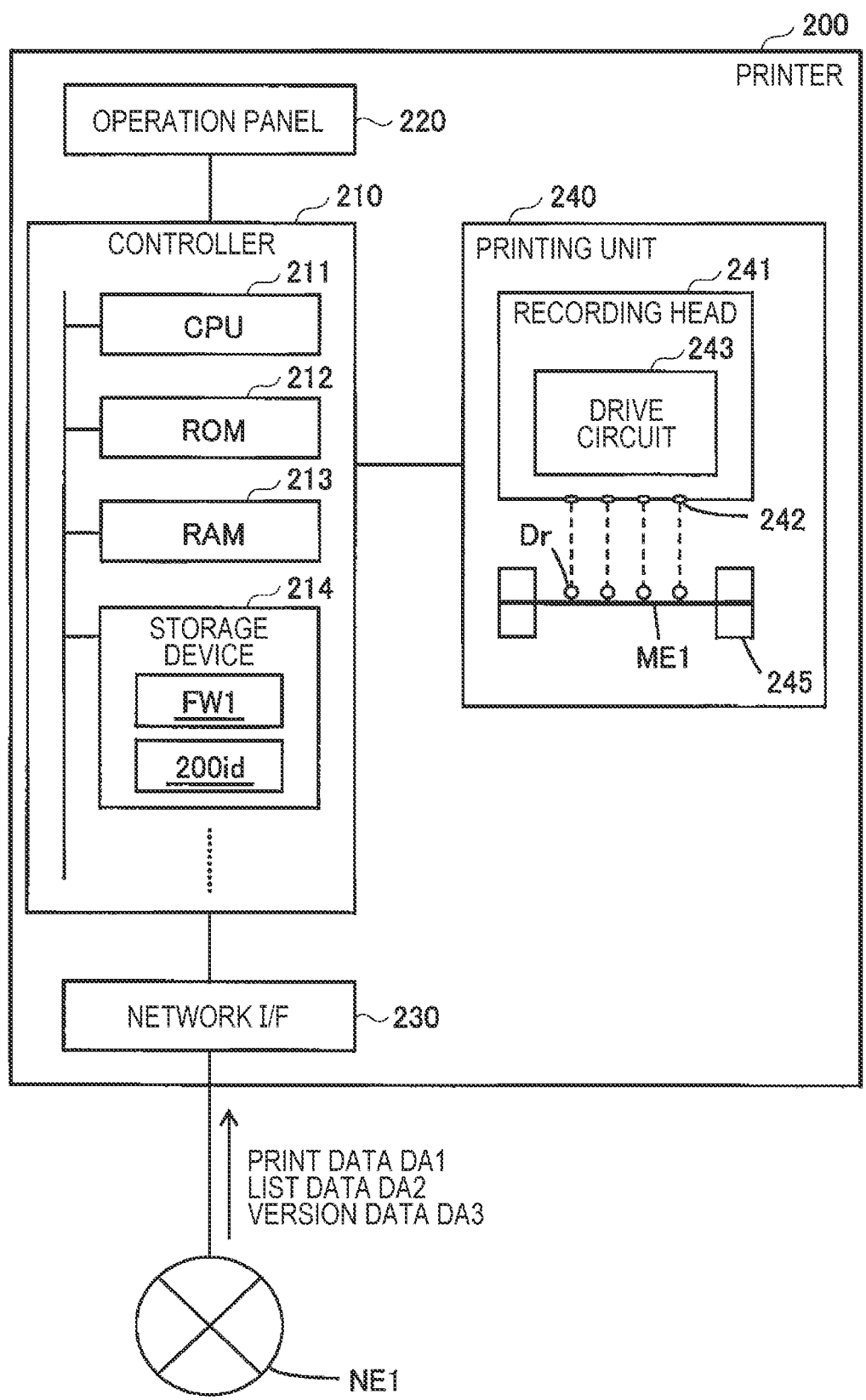
FIG. 4 is a block diagram schematically illustrating a configuration example of a printing device.

FIG. 4 schematically illustrates the configuration of the printer 200. The printer 200 illustrated in FIG. 4 is a printing device that can print the content CO2 in accordance with the print data DA1 received via the network NE1. The printer 200 of the present specific example can print the list L1 in accordance with the list data DA2 received via the network NE1, and when receiving also the version data DA3, the printer 200 prints the version information 610. The printer 200 usable for the printing system SY1 is not particularly limited, and may be an ink jet printer, or an electrophotographic printer such as a laser printer. Obviously, the printer 200 may be a copier, a facsimile, or a multifunctional device having these functions. FIG. 4 illustrates the configuration of the printer 200 which is an ink jet printer.

The printer 200 illustrated in FIG. 4 has a controller 210, an operation panel 220, a network I/F 230, and a print unit 240. The controller 210 includes a CPU 211, a ROM 212, a RAM 213, and a storage device 214. These components 211 to 214 are electrically coupled, thereby making it possible to input and output information to and from each other. In other words, the printer 200 is a type of a computer. The storage device 214 stores a firmware FW1 which causes a computer to function as the printer 200, and printer identification information 200*id* to identify the printer 200 individually. An email address, an IP address, and a serial number may be used as the printer identification information 200*id*. Here, the IP address is an abbreviation of Internet Protocol Address. A nonvolatile semiconductor memory such as a flash memory, and a magnetic storage device such as a hard disk may be used as the storage device 214.

The operation panel 220 includes a display unit and an operation input, and receives an operation by the user US0. The display unit is comprised of, for example, a liquid crystal panel, and displays information indicating the state of the printer 200, and information indicating an instruction by the user US0. The operation input is comprised of, for example, multiple operation keys including cursor keys and the enter key. The operation input may be a touch panel that receives an operation to the display screen. The network I/F 230 is connected to the network NE1, and communicates with the devices connected to the network NE1 in accordance with a predetermined communication standard.

The print unit 240 has a recording head 241 that discharges droplets Dr, such as ink drop, to a print substrate, and a paper feeder 245 that transports the print substrate ME1. The recording head 241 has multiple nozzles 242 through which the droplets Dr are discharged, and a drive circuit 243 that ejects the droplets Dr through the nozzles 242. For the drive circuit 243, it is possible to use a circuit that drives a piezoelectric element to apply a pressure to the liquid in pressure chambers communicating with the nozzles 242, and a circuit that drives a thermal element to generate air bubbles by heat in the liquid of each pressure chamber. The droplets Dr hit the print substrate ME1 transported by the paper feeder 245, thus a print image corresponding to the print data DA1 from the server 100 is formed on the print substrate ME1. Note that the print substrate is a material which holds print images. It is possible to use paper, resin, and metal as the print substrate. The shape of the print substrate is generally a rectangular shape or a roll shape, but may be a substantially circular shape such as an optical disk shape, a polygonal shape other than a rectangular shape, or a three-dimensional shape.

Figure 5:
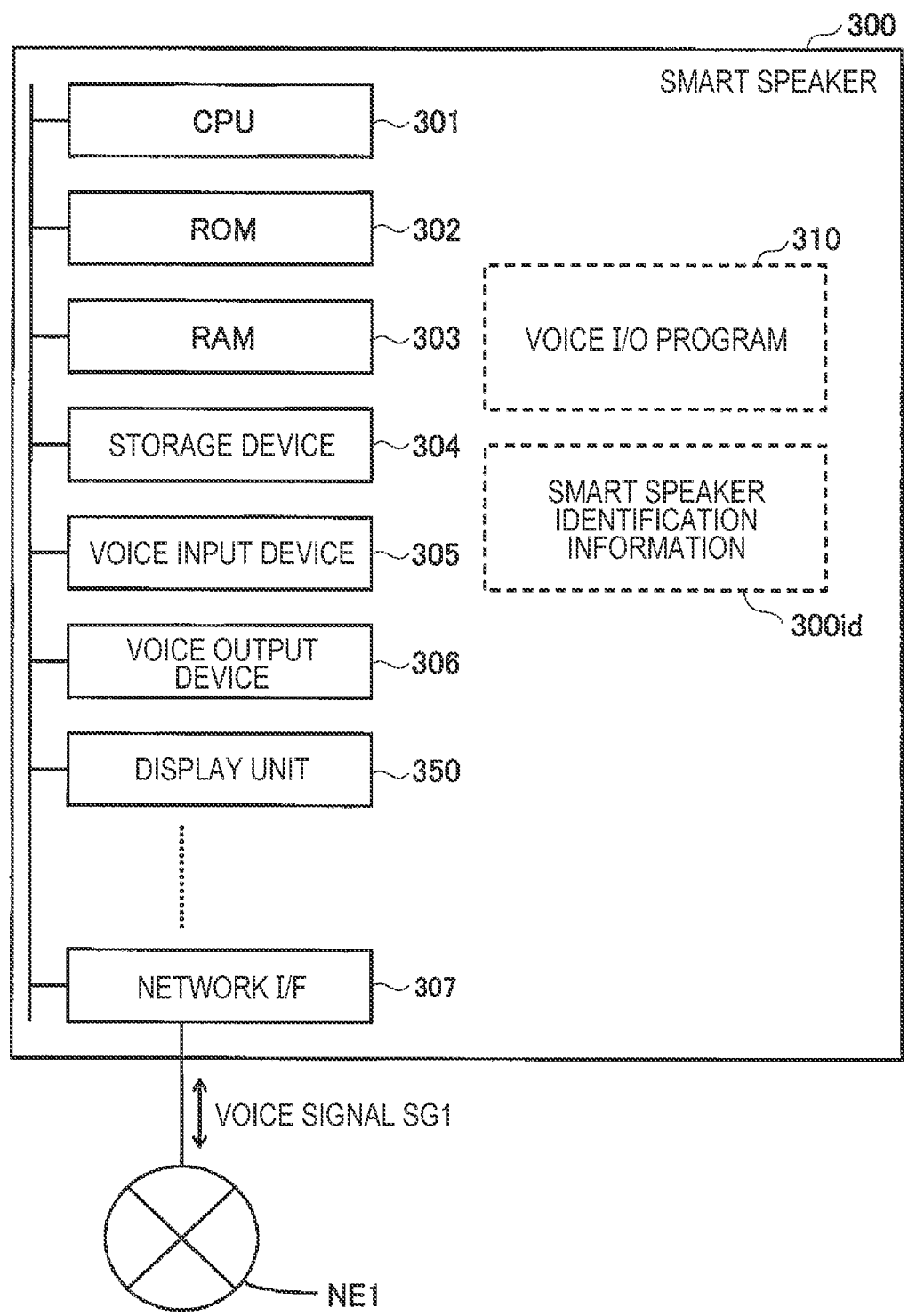
FIG. 5 is a block diagram schematically illustrating a configuration example of a voice I/O device.

FIG. 5 schematically illustrates the configuration of the smart speaker 300 utilizing the voice recognition service provided by the voice mediation device 400. The smart speaker 300 illustrated in FIG. 5 has a CPU 301, a ROM 302, a RAM 303, a storage device 304, a voice input device 305, a voice output device 306, a network I/F 307, and a display unit 350. These components 301 to 307, 350 are electrically coupled, thereby making it possible to input and output information to and from each other. In other words, the smart speaker 300 is a type of a computer. The storage device 304 stores a voice I/O program 310 which causes a computer to function as the smart speaker 300, and smart speaker identification information 300*id* to identify the smart speaker 300 individually. A nonvolatile semiconductor memory such as a flash memory, and a magnetic storage device such as a hard disk may be used as the storage device 304. The display unit 350 is comprised of, for example, a liquid crystal panel, and displays information indicating the state of the smart speaker 300.

Note that the user US0 may use a smart speaker including no display unit instead of the smart speaker 300 including the display unit 350. The voice input device 305 has a microphone, converts the voice input from the outside into an analog electrical signal by the microphone, and converts the electrical signal into a digital audio signal SG1. The number of the voice input devices 305 provided in the smart speaker 300 may be one, or greater than or equal to two. The voice output device 306 has a speaker in the narrow sense, which converts an electrical signal into sound, converts the digital audio signal SG1 into an analog electrical signal, converts the analog electrical signal into voice by the speaker to output the voice to the outside. The number of the voice output devices 306 provided in the smart speaker 300 may be one, or greater than or equal to two. The network I/F 307 is connected to the network NE1, and communicates with the devices connected to the network NE1 in accordance with a predetermined communication standard.

The voice mediation device 400 illustrated in FIG. 1 is a server computer, and has, for example, a CPU, a ROM, a RAM, a storage device, an input device, a display device, and a network I/F. It is possible to use a mobile terminal, such as a smartphone or a tablet terminal, and a personal computer as the terminal 500 illustrated in FIG. 1.

3. Specific Example of Process of System

FIG. 6 schematically illustrates processes until printing is performed by voice input in a system including the printing system SY1. As described above, the "voice UI" refers to a section of the server 100, which implements the function called the voice UI, and the "cloud print service" refers to a section of the server 100, which implements the function called the cloud print service. Here, steps S108, S130 correspond to the guidance step ST0, the step implemented by the guidance unit 112, and the step implemented by the guidance function FU2. Step S118 corresponds to the print instruction acquisition step ST1, the step implemented by the print instruction acquisition unit 111, and the step implemented by the print instruction acquisition function FU1. Step S120 corresponds to the print data generation step ST2. Steps S122 to S124 correspond to the print data transmission step ST3. Steps S120 to S122 correspond to the step implemented by the transmitter 124, and the step implemented by the transmission function FU3. Step S126 corresponds to the print step ST4. Hereinafter "step" is omitted, and a symbol for each step is shown in parentheses.

When the user US0 utters a word to the smart speaker 300 to call a voice print application called "AAA" of the printing system SY1, the smart speaker 300 converts the voice from the user US0 into digital audio signal SG1, and transmits the digital audio signal SG1 to the voice mediation device 400 via the network NE1 (S102). After receiving the digital audio signal SG1, the voice mediation device 400 acquires the identification information of the user US0, analyzes the voice based on the digital audio signal SG1, and requests the voice UI to start the voice print application (S104).

The voice mediation device 400 stores the identification information of each user in the storage device, and stores smart speaker identification information 300*id* associated with the identification information of the user US0. Thus, when the smart speaker 300 transmits the smart speaker identification information 300*id*, the voice mediation device 400 can acquire the identification information of the user US0 associated with the smart speaker identification information 300id. In addition, the voice mediation device 400 stores information indicating the characteristics of the voice of each user in the storage device in association with the identification information of the user US0. The characteristics of the voice to identify the user US0 can be expressed by the frequency distribution of the voice, for example. Thus, the voice mediation device 400 determines the frequency distribution of the voice based on the digital audio signal SG1, and may acquire from the storage device the identification information of the user US0 associated with a frequency distribution closest to the above-mentioned frequency distribution. Furthermore, the smart speaker 300 receives a voice input of the name of the user US0, and the voice mediation device 400 may extract the name of the user US0 based on the digital audio signal SG1 indicating the name of the user US0 to acquire the identification information of the user US0 associated with the name from the storage device.

The voice UI starts the voice print application in response to a request from the voice mediation device 400 (S106), and requests the voice mediation device 400 to read a start message, such as "What would you like to print?" as the guidance message GM1 (S108). After receiving the guidance message GM1, the voice mediation device 400 converts the guidance message GM1 into a digital audio signal SG1, and transmits the converted digital audio signal SG1 to the smart speaker 300 via the network NE1 (S110). After receiving the audio signal SG1, the smart speaker 300 converts the converted digital audio signal SG1 to voice representing the guidance message GM1, and outputs the voice (S112). Consequently, the voice of a start message, such as "What would you like to print?" is read for the user US0. After hearing the voice, when the user US0 utters voice of print instruction PI, such as "Print . . . ", the processes after S114 are performed.

When the user US0 utters to the smart speaker 300 the print instruction PI for the content CO2 included in the printable content CO1, the smart speaker 300 converts the voice of the print instruction PI from the user US0 into a digital audio signal SG1 corresponding to the print instruction PI, and transmits the digital audio signal SG1 to the voice mediation device 400 (S114). After receiving the digital audio signal SG1 corresponding to the print instruction PI, the voice mediation device 400 acquires the identification information of the user US0, analyzes the voice based on the digital audio signal SG1 corresponding to the print instruction PI, extracts a keyword KE0 corresponding to the content CO2 from a result of the analysis of the voice, and passes the keyword KE0 to the voice UI to request for the print instruction PI (S116). The keyword KE0 is included in the print instruction PI by voice. The print instruction PI may include a keyword which identifies the printer 200. The voice UI acquires the print instruction PI including the keyword word KE0 from the voice mediation device 400, and requests the cloud print service to print the content CO2 corresponding to the keyword KE0 (S118).

The cloud print service generates print data DA1 using the content CO2 requested from the voice UI (S120). The print data DA1 is data for causing the printer 200 to print the content CO2 based on the print instruction PI among the printable content CO1. After the print data DA1 is generated, the cloud print service transmits the print data DA1 to the printer 200 via the network NE1 (S122). As described above, the transmitter 124 of the server 100 transmits to the printer 200 the print data DA1 for printing the content CO2 based on the print instruction PI among the printable content CO1.

The printer 200 receives the print data DA1 via the network NE1 (S124), and performs printing in accordance with the print data DA1 (S126). Thus, the content CO2 according to the utterance of the user US0 is printed.

In addition, after transmitting the print data DA1, the cloud print service sends to the voice UI a notification of completion of printing of the content CO2 (S128). After receiving the notification of completion of printing, the voice UI requests the voice mediation device 400 to read out the name of the content CO2 as well as a print completion message such as " . . . has been printed" as the guidance message GM1 (S130). After receiving the guidance message GM1 showing the print completion message, the voice mediation device 400 converts the guidance message GM1 into a digital audio signal SG1 indicating the print completion message, and transmits the digital audio signal SG1 to the smart speaker 300 (S132). After receiving the digital audio signal SG1 indicating the print completion message, the smart speaker 300 converts the digital audio signal SG1 into voice showing the print completion message, and outputs the voice showing the print completion message (S134). Thus, the user US0 can hear the voice showing that the content CO2 has been printed.

Here, when many pieces of printable content CO1 are provided, even when the printing system SY1 illustrated in FIG. 1 has a function of reading out the list of the printable content CO1, it is difficult for the user US0 to retrieve the types and names of many pieces of content CO1. Even when the printing system SY1 has a function of displaying the list of the printable content CO1 on the display unit 350 of the smart speaker 300 and the display unit of the terminal 500, the area of each display unit is limited, and many display units have a small screen. Therefore, it is difficult for the user US0 to retrieve the types and names of many pieces of printable content CO1 by display units with a limited area. Furthermore, some smart speakers 300 have no display unit 350, and the terminal 500 may not be connected to the printing system SY1. Thus, the printing system SY1 of the present specific example outputs from the printer 200 print items in the list L1 for which the types and names of many pieces of printable content CO1 are quickly retrievable. Regardless of the quantity of the printable content CO1, all the list L1 is output to the print substrate ME1 by printing the list L1. The user US0 can easily retrieve the printable content CO1 by viewing the print items in the list L1 of at least part of the printable content CO1.

FIG. 7 schematically illustrates a process of printing the list L1 then printing the content CO2 by voice input in a system including the printing system SY1. A location where a process, similar to a process of FIG. 6, is performed in FIG. 7 is labeled with a corresponding symbol illustrated in FIG. 6. It is assumed that a voice print application is started in the voice UI by the processes in S102 to S112 illustrated in FIG. 6, and a start message such as "What would you like to print?" is read out by the smart speaker 300 voice. After hearing the voice, when the user US0 utters voice for the list print instruction LPI, such as "Print the list of . . . ", the processes in and after S114 are performed. The list print instruction LPI is an instruction for causing the printer 200 to print the list L1 of at least part of the printable content CO1. When the category is design paper, the process in S114 is such that upon an utterance such as "Print the list of design paper", the voice input of the list print instruction LPI is received. In the process in S114, when an utterance, such as "Print border 1 of the design paper" is output, the content CO2 is identified, thus the voice input of the list print instruction LPI is received. The list print instruction LPI is a type of the print instruction PI. Obviously, the list print request keyword is not limited to "Print the list of . . . ", and may include similar variety of variations, such as "Perform printing of the list of . . . ". Thus, for voice including these variations, the server 100 may perform a process similar to the process for voice including the list print request keyword "Print the list of . . . ".

In FIG. 7, S216, S130 correspond to the guidance step ST0, the guidance unit 112, and the guidance function FU2. S204, S118 correspond to the print instruction acquisition step ST1, the print instruction acquisition unit 111, and the print instruction acquisition function FU1. S206 corresponds to the list data acquisition step ST5. S208 to S210 correspond to the list data transmission step ST6. S206 to S208 correspond to the transmitter 124, and the transmission function FU3. S212 corresponds to the list print step ST7.

When the user US0 utters the list print instruction LPI to the smart speaker 300, the smart speaker 300 converts the voice of the list print instruction LPI from the user US0 into a digital audio signal SG1 corresponding to the list print instruction LPI, and transmits the digital audio signal SG1 to the voice mediation device 400 (S114). After receiving the digital audio signal SG1 corresponding to the list print instruction LPI, the voice mediation device 400 acquires the identification information of the user US0, analyzes the voice based on the digital audio signal SG1 corresponding to the list print instruction LPI, extracts a keyword KE0 corresponding to a category from a result of the analysis of the voice, and passes the keyword KE0 to the voice UI to request for the list print instruction PI (S202). The request passed to the voice UI by the voice mediation device 400 is not particularly limited, and can be expressed by "Print the list of Request {userID} {design_paper}", for example. As described above, "{userID}" refers to the identification information of the user US0, and "design_paper" refers to the keyword KE0 such as "design paper". The keyword KE0 illustrated in FIG. 7 is included in the list print instruction LPI by voice. The list print instruction LPI may include the keyword KE0 to identify the printer 200. The voice UI acquires the list print instruction LPI including the keyword KE0 from the voice mediation device 400, and requests the cloud print service to print the list L1 of at least part of the printable content CO1 in a category corresponding to the keyword KE0 (S204).

The cloud print service reads list data DA2 for printing the list L1 in the category requested from the voice UI from the list storage 122 (S206). As illustrated in FIG. 3, for each category, the list storage 122 stores list data DA2 for printing the list L1 of all the latest printable content CO1. Thus, the cloud print service reads from the list storage 122 the list data DA2 corresponding to the requested category. For example, when the category is design paper, the list data DA2 including border 1, border 2, border 3 is read out as the printable content CO1.

After the list data DA2 is read out, the cloud print service transmits the list data DA2 to the printer 200 via the network NE1 (S208). As described above, when the list print instruction LPI is acquired, the transmitter 124 of the server 100 transmits to the printer 200 the list data DA2 for printing the list L1 of all the latest printable content CO1.

The printer 200 receives the list data DA2 via the network NE1 (S210), and performs printing in accordance with the list data DA2 (S212). After transmitting the list data DA2, the cloud print service sends to the voice UI a notification of completion of printing of the list L1 for the relevant category (S214). After receiving the notification of completion of the list printing, the voice UI requests the voice mediation device 400 to read out the name of the relevant category as well as a list print completion message such as "The list of . . . has been printed" as the guidance message GM1 (S216). After receiving the guidance message GM1 showing the list print completion message, the voice mediation device 400 converts the guidance message GM1 into a digital audio signal SG1 indicating the list print completion message, and transmits the audio signal SG1 to the smart speaker 300 (S218). After receiving the digital audio signal SG1 indicating the list print completion message, the smart speaker 300 converts the digital audio signal SG1 into voice, and outputs the voice (S220). Thus, the user US0 can hear the voice showing that the list L1 for the relevant category has been printed. When the category is design paper, the voice of a list print completion message such as "The list of design paper has been printed" is output.

Figure 8:
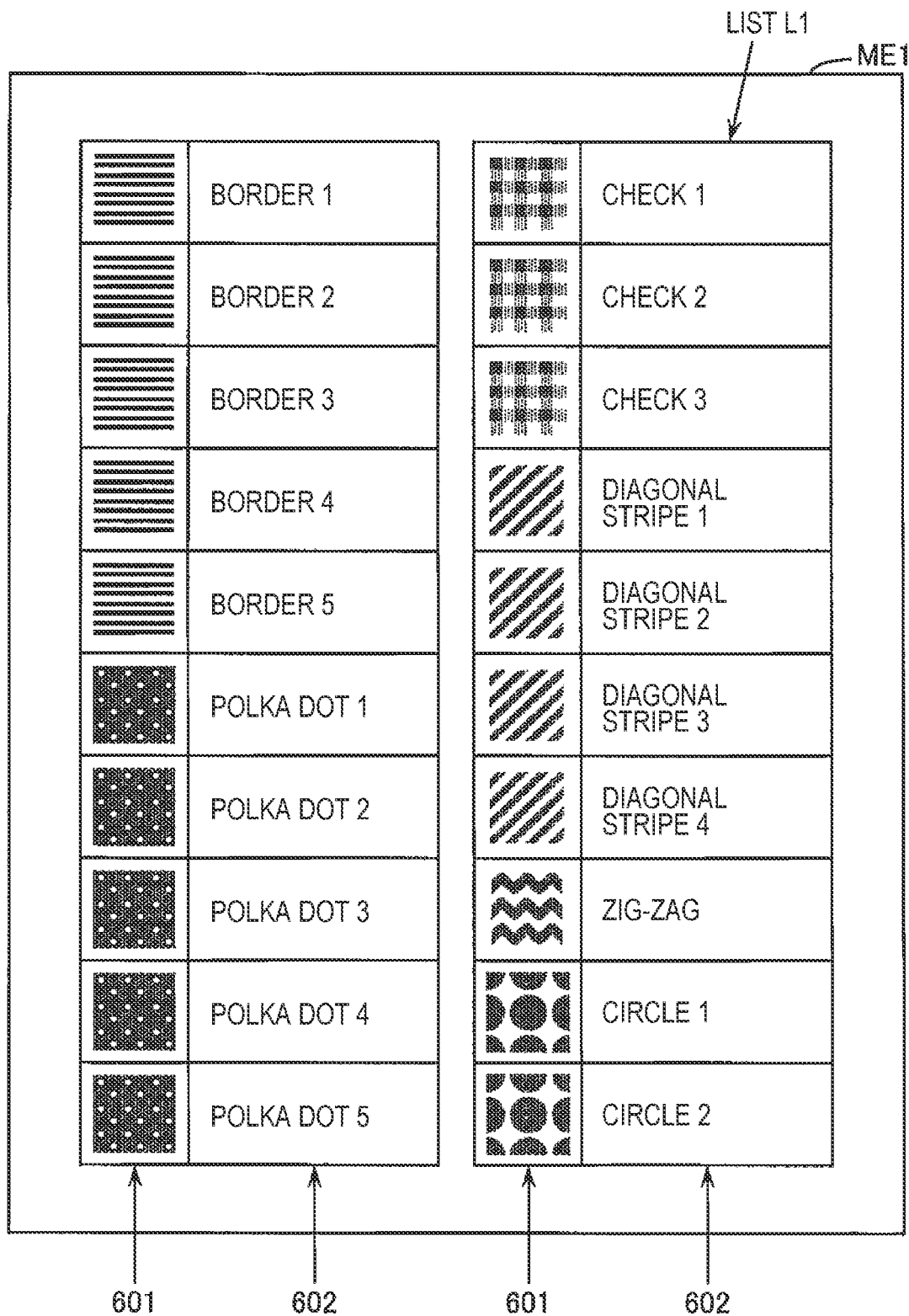
FIG. 8 is a chart schematically illustrating an example of list print items.

FIG. 8 schematically illustrates list print items output from the printer 200. The list print items are such that the list L1 is formed on the print substrate ME1. The list L1 illustrated in FIG. 8 is a list of the printable content CO1 included in the design paper as the category, and includes patterns 601 of printable content CO1, and name 602 of each of the patterns 601. The user US0 can easily retrieve the printable content CO1 by viewing the print items in the list L1, and can easily select the content CO2 to be printed from the printable content CO1.

When the user US0 utters a print instruction PI to the smart speaker 300 for content CO2 included in the printable content CO1 in the list print items, the smart speaker 300 converts the voice of the print instruction PI from the user US0 into a digital audio signal SG1 corresponding to the print instruction PI, and transmits the digital audio signal SG1 to the voice mediation device 400 (S114). After receiving the digital audio signal SG1 corresponding to the print instruction PI, the voice mediation device 400 acquires the identification information of the user US0, analyzes the voice based on the digital audio signal SG1 corresponding to the print instruction LPI, extracts a keyword KE0 corresponding to the content CO2 from a result of the analysis of the voice, and passes the keyword KE0 to the voice UI to request for the print instruction PI (S116). The print instruction PI may include a keyword KE0 to identify the printer 200. The voice UI acquires the print instruction PI including the keyword KE0 from the voice mediation device 400, and requests the cloud print service to print the content CO2 corresponding to the keyword KE0 (S118).

The cloud print service generates print data DA1 using the content CO2 requested by the voice UI (S120). After the print data DA1 is generated, the cloud print service transmits the print data DA1 to the printer 200 via the network NE1 (S122). As described above, the transmitter 124 of the server 100 transmits to the printer 200 print data DA1 for printing the content CO2 based on the print instruction PI among the printable content CO1 in the list L1.

The printer 200 receives print data DA1 via the network NE1 (S124), and performs printing in accordance with the print data DA1 (S126). Consequently, the content CO2 based on the print instruction PI among the printable content CO1 in the print items in the list L1 is printed.

After transmitting the print data DA1, the cloud print service sends to the voice UI a notification of completion of printing of the content CO2 (S128). After receiving the notification of completion of printing, the voice UI requests the voice mediation device 400 to read out the name of the content CO2 as well as a print completion message, such as " . . . has been printed" as the guidance message GM1 (S130). After receiving the guidance message GM1 showing the print completion message, the voice mediation device 400 converts the guidance message GM1 into a digital audio signal SG1 indicating the print completion message, and transmits the digital audio signal SG1 to the smart speaker 300 (S132). After receiving the digital audio signal SG1 indicating the print completion message, the smart speaker 300 converts the digital audio signal SG1 into voice corresponding to the guidance message GM1 showing the print completion message, and outputs the voice (S134).

As described above, when the print instruction PI is a list print instruction LPI for printing the list L1 of the printable content CO1, the printer 200 directly operable by the user US0 prints the list L1 in accordance with the list data DA2. Thus, regardless of whether or not the smart speaker 300 is provided with the display unit 350, even when the terminal 500 is not prepared, the user US0 can view the list L1 of the printable content CO1. As a consequence, the user US0 can easily retrieve the printable content CO1 by viewing the print items in the list L1. Therefore, the printing system SY1 of the present specific example facilitates the retrieval of the printable content CO1 by a voice instruction.

Although the above-described list L1 is the list of all printable content CO1 in a selected category, the list L1 may be a list of part of the printable content CO1. For example, the list L1 may be a list of content CO2 with the most recent date on which download is available among the printable content CO1. In S114 illustrated in FIGS. 6 and 7, when the user US0 utters a print instruction PI specifying only a category, such as "Print design paper", the printing system SY1 may output a guidance message GM1 for an inquiry, such as "Which design paper would you like to print, or would you like to print the list?". In this case, when the user US0 utters a print instruction PI for content CO2, such as "Print border 1", the printing system SY1 may print the content CO2 in accordance with the processes in S118 to S126. When the user US0 utters a list print instruction LPI, such as "Print the list", the printing system SY1 prints the list L1 in accordance with the processes in S204 to S212.

4. Modification

The present disclosure allows various modifications. The voice I/O device to which the present technique is applicable is not limited to the smart speaker 300, and may be a terminal such as a smartphone and a tablet, or a personal computer. The list storage 122 is not necessarily provided in the cloud print service, and may be provided in the voice UI. In the above-described specific example, the list data DA2 is stored in the list storage 122; however, this is not always the case. For example, when the list print instruction LPI is acquired, the transmitter 124 generates list data DA2 based on the printable content CO1, and may transmit the list data DA2 to the printer 200. The above-mentioned list L1 is prepared for each category; however, the list L1 may be a list of printable content CO1 which is not classified by category.

As illustrated in FIGS. 9 and 10, the list L1 may include pieces of content identification information CID, each of which is associated with corresponding printable content CO1, and version information 610 representing the version may be added to the list L1. FIG. 9 schematically illustrates a list print control process to be performed by the cloud print service in substitution for the processes in S206 to S208, S214 illustrated in FIG. 7. FIG. 10 schematically illustrates the list print items in which the version information 610 is added to the list L1 including the content identification information CID. The list storage 122 illustrated in FIG. 3 stores content identification information CID assigned to each of the printable content CO1, and version data DA3 for printing version information 610.

When the list print control process illustrated in FIG. 9 is started, the cloud print service receives from the voice UI keyword KE0 corresponding to a category which is a target of request for list printing, and reads from the list storage 122 list data DA2 including the content identification information CID for the relevant category (S302). In addition, the cloud print service reads from the list storage 122 version data DA3 associated with the list data DA2 which has been read (S304). After the list data DA2 and the version data DA3 are read, the cloud print service transmits the list data DA2 and the version data DA3 to the printer 200 via the network NE1 (S306). Thus, when the list print instruction LPI is acquired by the voice UI, the transmitter 124 of the server 100 transmits to the printer 200 the content identification information CID as well as the list data DA2 for printing the list L1, and the version data DA3.

The printer 200 receives the list data DA2 and the version data DA3 via the network NE1, and prints the list L1 with the version information 610 added as illustrated in FIG. 10 in accordance with the list data DA2 and the version data DA3. The printer 200 forms list L1 on the print substrate ME1 based on the list data DA2 including the content identification information CID, the list L1 including the patterns 601 of the printable content CO1, the name 602 of each pattern 601, and the content identification information CID associated with each pattern 601. The content identification information CID illustrated in FIG. 10 indicates identification numbers. For example, border 1, border 2, border 3, . . . are assigned identification numbers 1, 2, 3, . . . , respectively. The printer 200 adds the version information 610 representing the version of the list L1 to the list L1 based on the version data DA3. FIG. 10 illustrates that the category "design paper" followed by version information "Ver. 3.06" is added to the upper left of the list L1. Obviously, the print position of version information 610 in the list print items is not limited to the upper left of the list L1, and may be the lower left or the lower right of the list L1.

After transmitting the list data DA2 and the version data DA3, the cloud print service sends to the voice UI a notification of completion of printing of the list L1 for the relevant category (S308). Subsequently, voice of the name of the relevant category as well as the list print completion message are output from the smart speaker 300 in accordance with the processes in S216 to S220 illustrated in FIG. 7.

After viewing the list print items illustrated in FIG. 10, the user US0 utters to the smart speaker 300 the content identification information CID associated with the content CO2 desired to be printed among the printable content CO1, thus the content CO2 can be printed. The processes until the content CO2 is printed can be performed according to the processes after S220 illustrated in FIG. 7. Thus, a description is given with reference to FIG. 7. When the user US0 utters content identification information CID to the smart speaker 300 as the print instruction PI, the content identification information CID being associated with the content CO2 included in the printable content CO1 in the list print items, the smart speaker 300 converts the voice of the print instruction PI from the user US0 into digital audio signal SG1 corresponding to the print instructions PI, and transmits the digital audio signal SG1 to the voice mediation device 400 (S114). Note that the user US0 may utter a print instruction PI to the smart speaker 300 for content CO2 included in the printable content CO1 in the print items of the list L1. After receiving the digital audio signal SG1, the voice mediation device 400 acquires the identification information of the user US0, analyzes the voice based on the digital audio signal SG1 corresponding to the print instruction PI, extracts a keyword KE0 corresponding to the content CO2 from a result of the analysis of the voice, and passes the keyword KE0 to the voice UI to request for the print instruction PI (S116). The voice UI acquires the print instruction PI including the keyword KE0 from the voice mediation device 400, and requests the cloud print service to print the content CO2 identified by the content identification information CID which is the keyword KE0 (S118). In this manner, the print instruction acquisition unit 111 of the server 100 acquires the content identification information CID of voice from the voice mediation device 400, and requests the cloud print service to print the content CO2.

The cloud print service generates print data DA1 using the content CO2 requested by the voice UI (S120). After the print data DA1 is generated, the cloud print service transmits the print data DA1 to the printer 200 via the network NE1 (S122). As described above, the transmitter 124 of the server 100 transmits to the printer 200 the print data DA1 for printing the content CO2 identified by the content identification information CID.

The printer 200 receives the print data DA1 via the network NE1 (S124), and performs printing in accordance with the print data DA1 (S126). Consequently, the content CO2 identified by the content identification information CID of voice is printed. Thus, the examples illustrated in FIGS. 9 and 10 can facilitate the print instruction PI for the content CO2 in the list L1, and the retrieval of the version of the list L1 to be printed.

Figure 12:
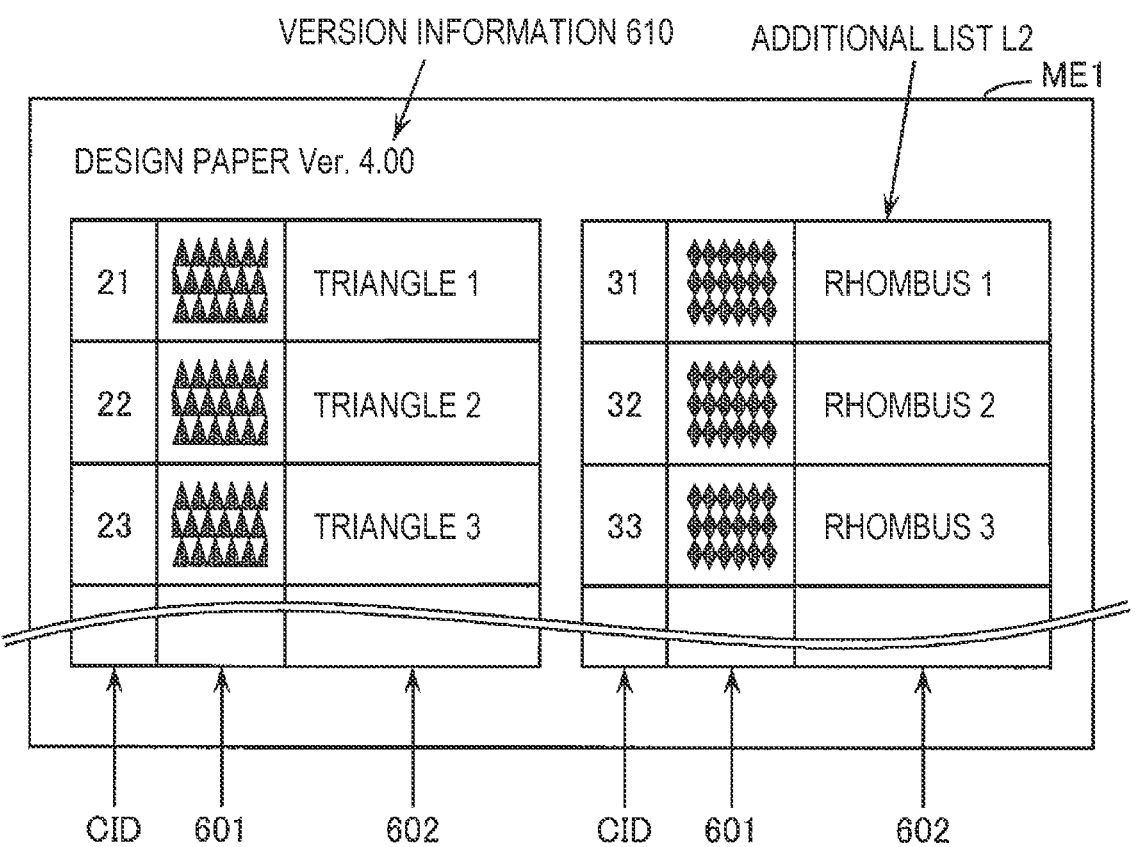
FIG. 12 is a chart schematically illustrating an example of print items in an additional list.

As illustrated in FIGS. 11 and 12, the list L1 may be an additional list L2 of the content not shown in the print history H1 (see FIG. 3) among the printable content CO1. For example, new content may be added to the printable content CO1 due to version up of the printable content CO1. FIG. 11 schematically illustrates an additional list print control process to be performed by the cloud print service in substitution for the processes in S206 to S208, S214 illustrated in FIG. 7. FIG. 12 schematically illustrates print items in which the version information 610 is added to the additional list L2 including the content identification information CID.

When the additional list print control process illustrated in FIG. 11 is started, the cloud print service receives from the voice UI the identification information of the user US0 and a keyword KE0 corresponding to a category which is a target of request for list printing, and reads the print history H1 associated with the identification information of the user US0 from the history storage 123 illustrated in FIG. 3 (S402). After the print history H1 is read, for the target category, the cloud print service reads from the list storage 122 illustrated in FIG. 3 list data DA2 of the additional list L2 of the content not shown in the print history H1 among the printable content CO1 (S404). Here, the cloud print service reads from the list storage 122 the list data DA2 including the content identification information CID and the version data DA3 associated with the list data DA2. After the list data DA2 and the version data DA3 are read, the cloud print service transmits the list data DA2 and the version data DA3 to the printer 200 via the network NE1 (S406). Thus, the transmitter 124 of the server 100 transmits list data DA2 to the printer 200 the list data DA2 for printing, as the list L1, the additional list L2 of the content not shown in the print history H1 stored in the history storage 123 among the printable content CO1.

The printer 200 receives the list data DA2 and the version data DA3 via the network NE1, and prints the additional list L2 with the version information 610 added as illustrated in FIG. 12 in accordance with the list data DA2 and the version data DA3. The printer 200 forms additional list L2 on the print substrate ME1 based on the list data DA2 including the content identification information CID, the additional list L2 including the patterns 601 of the printable content CO1, the name 602 of each pattern 601, and the content identification information CID associated with each pattern 601. The patterns 601 and the names 602 illustrated in FIG. 12 are different from the patterns 601 and the names 602 illustrated in FIG. 10. The content identification information CID illustrated in FIG. 12 indicates identification numbers different from the content identification information CID illustrated in FIG. 10. For example, triangle 1, triangle 2, triangle 3, . . . are assigned identification numbers 21, 22, 23, . . . , respectively. The printer 200 adds the version information 610 representing the version of the additional list L2 to the additional list L2 based on the version data DA3. FIG. 12 illustrates that the category "design paper" followed by version information "Ver. 4.00" is added to the upper left of the additional list L2.

After the list data DA2 and the version data DA3 are transmitted, the cloud print service updates the print history H1 associated with the identification information of the user US0 in the history storage 123 (S408). For example, it is assumed that the identification information of the user US0 is "UID1" as illustrated in FIG. 3, and the version information 610 of the print history H1 read in S402 is "Ver. 4.00" as illustrated in FIG. 12. In this case, the cloud print service updates "design paper Ver. 3.06" of the print history H1 associated with the user ID "UID1" to "design paper Ver. 4.00". Furthermore, the cloud print service sends to the voice UI a notification of completion of printing of the additional list L2 for the relevant category (S410). Subsequently, voice of the name of the relevant category and the list print completion message are output from the smart speaker 300 in accordance with the processes in S216 to S220 illustrated in FIG. 7. Thus, the examples illustrated in FIGS. 11 and 12 can facilitate the retrieval of the added printable content CO1.

Note that the user US0 who has viewed the additional list print items illustrated in FIG. 12 can print the content CO2 by uttering to the smart speaker 300 the content identification information CID associated with the content CO2 to be printed among the printable content CO1. In addition, the user US0 can print the content CO2 by uttering to the smart speaker 300 the print instruction PI for the content CO2 included in the printable content CO1 in the print items of the additional list L2. The processes until the content CO2 is printed can be performed according to the processes after S220 illustrated in FIG. 7.

The additional list print control process illustrated in FIG. 11 may be performed when the user US0 utters a list print instruction LPI such as "Print the list of new content of the design paper" or "Tell me new content of the design paper" in S114 illustrated in FIG. 7. In this case, when the user US0 utters a list print instruction LPI such as "Print the list of design paper" in S114 illustrated in FIG. 7, the printing system SY1 may print the list L1 of all the printable content CO1 according to the processes in S204 to S212. The processes described above may be modified as appropriate, for example, the processes may be changed in order. For example, in the additional list print control process of FIG.

11, the process of transmitting the list data DA2 in S406 and the process of updating the print history H1 in S408 may be replaced.

5. Conclusion

As described above, the present disclosure can provide a technique that facilitates the retrieval of printable content by voice instruction in various aspects. Even with a technique consisting of only the claim components according to independent claims, basic operations and effects described above are obtained. Also, it is possible to implement configurations in which the components disclosed in the above-described examples are replaced, or a combination is changed, and configurations in which the components disclosed in publicly known techniques and the above-described examples are replaced, or a combination is changed. These configurations are also included in the present disclosure.

What is claimed is:

1. A printing system comprising:
   a printing device; and
   a server connected to the printing device via a network, wherein
   the server includes:
      a print instruction acquisition unit that acquires a print instruction by voice from a voice mediation device and
      a transmitter that transmits to the printing device print data for printing content based on the print instruction among printable content,
   the printing device receives the print data, and performs printing in accordance with the print data,
   the print instruction includes a list print instruction for printing a list of at least part of the printable content,
   when the list print instruction is acquired, the transmitter transmits list data for printing the list to the printing device, and
   the printing device receives the list data, and prints the list in accordance with the list data.

2. The printing system according to claim 1, wherein
   the server further includes a list storage that stores the list data, and
   when the list print instruction is acquired, the transmitter reads the list data from the list storage, and transmits the list data to the printing device.

3. The printing system according to claim 1, wherein
   the print instruction includes an instruction for printing content contained in the printable content in the list, and
   the transmitter transmits to the printing device the print data for printing the content based on the print instruction among the printable content in the list.

4. The printing system according to claim 1, wherein
   the server further includes a history storage that stores a history of the list printed by the printing device,
   the transmitter transmits to the printing device the list data for printing, as the list, an additional list of content not shown in the history stored in the history storage among the printable content, and
   the printing device receives the list data, and prints the additional list in accordance with the list data.

5. The printing system according to claim 1, wherein
   when the list print instruction is acquired, the transmitter transmits to the printing device the list data for printing the list and version data for printing version information representing a version of the list, and
   the printing device receives the list data and the version data, and prints the list and the version information in accordance with the list data and the version data.

6. The printing system according to claim 1, wherein
   when the list print instruction is acquired, the transmitter transmits to the printing device identification information to identify the content contained in the list and the list data for printing the list,
   the printing device receives the list data, and prints the list including the identification information in accordance with the list data,
   the print instruction acquisition unit acquires the identification information by voice from a voice mediation device, and
   the transmitter transmits print data as the print data for printing content identified by the identification information to the printing device.

7. A server connected via a network to a printing device which performs printing in accordance with received data, the server comprising:
   a print instruction acquisition unit that acquires a print instruction by voice from a voice mediation device; and
   a transmitter that transmits print data to the printing device, the print data for printing content based on the print instruction among printable content, wherein
   the print instruction includes a list print instruction for printing a list of at least part of the printable content, and
   when the list print instruction is acquired, the transmitter transmits list data for printing the list to the printing device.

* * * * *